O. T. WELCH.
Nut-Lock.
No. 161,462. Patented March 30, 1875.
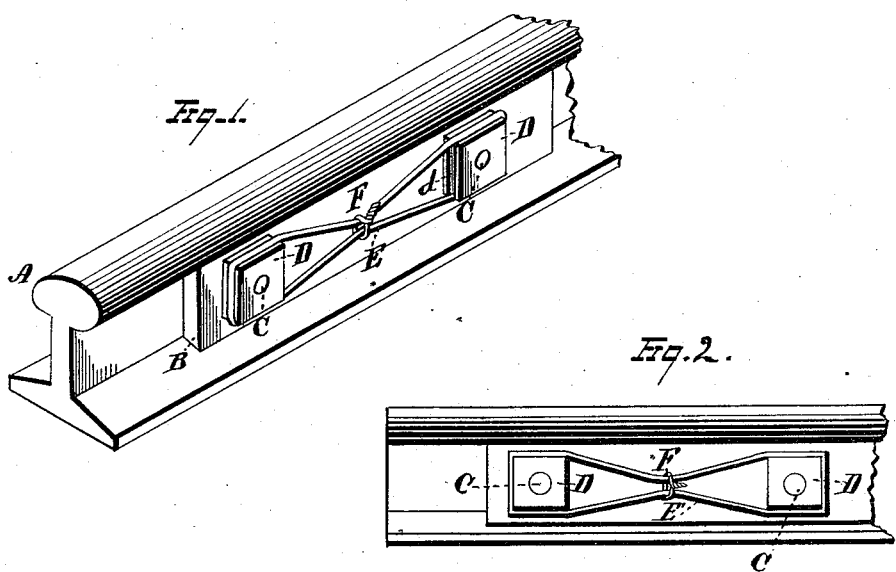

UNITED STATES PATENT OFFICE.

ORRIN T. WELCH, OF TOPEKA, KANSAS.

IMPROVEMENT IN NUT-LOCKS.

Specification forming part of Letters Patent No. 161,462, dated March 30, 1875; application filed September 21, 1874.

*To all whom it may concern:*

Be it known that I, ORRIN T. WELCH, of Topeka, in the county of Shawnee and State of Kansas, have invented certain new and useful Improvements in Railroad Nut-Locks; and I do hereby declare the following to be a full, clear, and exact description of the invention, such as will enable others skilled in the art to which it pertains to make and use it, reference being had to the accompanying drawings, which form part of this specification.

My invention relates to an improvement in nut-locks, designed for use upon railway fish-joints, or in other like localities where nuts are liable to work loose.

My invention consists in the combination of devices and appliances, as hereinafter set forth and claimed.

In the drawings, Figure 1 is a perspective view of a railroad-rail and fish-plate with my invention applied thereto; Fig. 2, a view, in elevation, of the same.

A is a rail, B the fish-plates, C the bolts, and D the nuts. The nuts D are provided with grooves $d$ in their edges, to receive the wire E. E is the wire which locks the nuts. It is bent as indicated, so as to pass over the nuts and extend between the same. About midway between the nuts the two strands of wire are brought together by a small wrapping of wire, F, as indicated in Fig. 1.

It will thus be seen that the wire E is firmly held in contact with the nuts, and prevents the latter from turning, while the grooves $d$ prevent the wire from slipping off from the nuts.

Having thus described my invention, what I claim as new, and desire to secure by Letters Patent, is—

A nut-lock formed of grooved nuts D, encircling wire E, and intermediate binding-wire F, substantially as and for the purpose described.

In testimony that I claim the foregoing I have hereunto set my hand this 2d day of September, 1874.

ORRIN T. WELCH.

Witnesses:
    THOS. E. IRVINE,
    JAMES M. SPENCER.